United States Patent
Brunelot et al.

(10) Patent No.: US 6,576,807 B1
(45) Date of Patent: Jun. 10, 2003

(54) METHOD AND APPARATUS FOR INCINERATING AND VITRIFYING OF WASTE, IN PARTICULAR RADIOACTIVE WASTE

(75) Inventors: Pierre Brunelot, Merignac (FR); Jacques Lacombe, Pujaut (FR); Serge Merlin, Igny (FR); Patrice Roux, Paris (FR); Valérie Thiebaut, Roquemaure (FR); Kwan-Sik Choi, Taejon (KR); Myung-Jae Song, Taejon (KR)

(73) Assignees: Société Générale pour les Techniques Nouvelles-SGN, St. Quentin en Yvelines (FR); Korea Electric Power Corporation, Seoul (KR)

( * ) Notice: Subject to any disclaimer, the term of this patent is extended or adjusted under 35 U.S.C. 154(b) by 0 days.

(21) Appl. No.: 09/856,685
(22) PCT Filed: Dec. 1, 1999
(86) PCT No.: PCT/FR99/02978
  § 371 (c)(1),
  (2), (4) Date: May 24, 2001
(87) PCT Pub. No.: WO00/32525
  PCT Pub. Date: Jun. 8, 2000

(30) Foreign Application Priority Data

Dec. 1, 1998 (KR) .......................... 98/052360
Dec. 1, 1998 (KR) .......................... 98/052361

(51) Int. Cl.$^7$ .............................. A62D 3/00; C03B 5/00; C03B 8/04
(52) U.S. Cl. ...................... 588/201; 65/134.4; 65/134.5; 65/134.8; 65/355; 588/11; 588/900
(58) Field of Search ................................. 588/201, 900, 588/19, 11, 12; 65/27, 134.1, 134.4, 134.5, 134.8, 355; 100/236, 237, 243, 251, 255, 238

(56) References Cited

U.S. PATENT DOCUMENTS 3,592,151 A * 7/1971 Webber ....................... 110/228
3,607,171 A   9/1971 Hirsch ............................ 65/22
3,812,620 A * 5/1974 Titus et al. .................. 110/250

(List continued on next page.)

FOREIGN PATENT DOCUMENTS

| DE | 44 46 576 C1 | 4/1996 |
| EP | 0 647 598 A1 | 4/1995 |
| WO | 95/04004 | 9/1995 |

OTHER PUBLICATIONS

Pujadas, Valérie, "Reactor Waste Treatment by Direct Vitrification: Main Experiment Results". KAIF '98, Korean Atomic Industrial Forum, Seoul, Korea, Apr. 14–17, 1998.

*Primary Examiner*—Steven Bos
*Assistant Examiner*—Anthony Kuhar
(74) *Attorney, Agent, or Firm*—Nath & Associates PLLC; Gary M. Nath; Marvin C. Berkowitz (57) ABSTRACT

The present invention provides a method of processing organic waste (D) in divided solid and/or liquid form, the method being implemented in a single reactor (1) containing a bath of molten gas (V) surmounted by a gas phase (G), the method comprising incinerating said waste (D) in the presence of oxygen at the surface (S) of said bath of molten glass (V), and vitrifying said incinerated waste (D) in said bath of molten glass (V). In characteristic manner, in said method, said waste (D) is introduced into said reactor (1) in association with dual cooling; the device (5) for feeding said reactor (1) with said waste (D) is cooled on its side adjacent to the gas phase (G), advantageously by the circulation of at least one is cooling fluid maintained at a temperature higher than the dew point of said gas phase (G), and it is also cooled, advantageously independently, on its side adjacent to the incoming waste (D). The present invention also provides apparatus for processing organic waste (D) in divided solid and/or liquid form by incineration and vitrification, which apparatus is suitable for implementing said method.

22 Claims, 4 Drawing Sheets

U.S. PATENT DOCUMENTS

| | | | | |
|---|---|---|---|---|
| 4,574,714 A | * | 3/1986 | Bach et al. | 110/238 |
| 4,617,042 A | * | 10/1986 | Stickler | 65/136.1 |
| 4,635,570 A | * | 1/1987 | Ewest et al. | 110/215 |
| 5,585,532 A | * | 12/1996 | Nagel | 588/201 |
| 5,606,925 A | * | 3/1997 | Boen et al. | 110/250 |
| 5,643,350 A | | 7/1997 | Mason et al. | 65/158 |
| 5,728,190 A | * | 3/1998 | Pieper et al. | 588/252 |
| 5,809,911 A | * | 9/1998 | Feizollahi | 110/346 |
| 5,908,564 A | * | 6/1999 | Titus et al. | 219/121.36 |
| 6,160,238 A | * | 12/2000 | Titus et al. | 219/121.37 |

* cited by examiner

METHOD AND APPARATUS FOR INCINERATING AND VITRIFYING OF WASTE, IN PARTICULAR RADIOACTIVE WASTE

The present invention relates to a method and to apparatus for incinerating and vitrifying waste, in particular radioactive waste.

Said invention lies within the context of processing dangerous combustible waste for which it is appropriate to fix the ash in stable manner. To neutralize waste of that type, it has long been the practice to operate in two stages, each of said stages being implemented in an independent apparatus:

a first step of incinerating said organic waste, in divided solid and/or liquid form in an incinerator apparatus; and a second stage of fixing the ash recovered from said first stage, said second stage being implemented in suitable apparatus that contains a bath of glass maintained in the molten state.

Nevertheless, for several years, waste processing methods have been described in which said two stages of incinerating said waste and fixing the resulting ash have been implemented in a single apparatus. In this context, a term that is used is "direct vitrification".

Results obtained in said context by the Applicants have been described in particular at the "Korean Atomic Industrial Forum" (KAIF) '98, which was held Apr. 14 to 17, 1998 in Seoul, South Korea. Said results demonstrated the feasibility of a direct vitrification method, in which the waste is burned for the most part at the surface of a bath of molten glass, in an oxidizing atmosphere, with the ash that is generated being trapped and fixed in said bath of molten glass; since said method was implemented in a cold crucible, said bath of molten glass was heated by induction.

Continuing their work on direct vitrification, the Applicants have designed and developed the present invention which can be considered as being an improvement of said direct vitrification as presently known. The improvement which constitutes the main subject matter of the present invention can be thought of both in terms of a method and in terms of apparatus, and it takes place in introducing the waste. Said improvement which, in order to clarify the present description, can be referred to as the "main" improvement, is advantageously implemented with other improvements that, in the same spirit, can be referred to as "secondary" improvements. Said main and secondary improvements are described below in general terms and then in greater detail with reference to the accompanying figures.

Thus, in a first aspect, the present invention provides a method of processing organic waste (i.e. combustible waste) in divided solid form (to facilitate insertion and combustion) and/or in liquid form, the method being implemented in a single reactor containing a bath of molten glass surmounted by a gas phase; said processing method comprising: incinerating said waste in the presence of oxygen at the surface of said bath of molten glass (said waste falling onto said surface, decomposing thereon, and the resulting gaseous products of said decomposition being burned in said oxygen-containing gas phase); and vitrifying said incinerated waste in said bath of molten glass. In this respect, the method of the invention is a direct vitrification method.

In characteristic manner, according to the invention, said waste is introduced into said reactor (into the gas phase of said reactor) in association with dual cooling. This can be thought of as cooling the device per se for feeding said reactor with waste and indirect cooling via said device of the waste that is being introduced. Said device for feeding said reactor with said waste is cooled firstly on its side passing through the gas phase and secondly, and advantageously independently, on its side where the waste arrives.

The first cooling is intended above all to protect said feeder device from corrosion which develops where it is in contact with the gas phase; the second cooling is intended above all to minimize the amount of heat transferred to the incoming waste, in order to minimize vaporization of liquid waste and prevent solid waste sticking together, where this can lead to the feeder device becoming clogged.

In order to implement such cooling, the structure of the feeder device has provision to circulate cooling fluids, generally cooling liquids. In a particularly preferred variant of said dual cooling, in order to implement at least the first cooling, a circuit is provided for at least one cooling fluid, which fluid is maintained at a temperature higher than the dew point of the gas phase through which the device passes. This is intended to avoid any condensation of said gas phase on the walls of said feeder device. This condensation phenomenon is clearly harmful, given the problems of corrosion. It can also give rise to electric arcing and thus raise serious problems when heating the bath of glass by induction. In this advantageous variant, the "hot" cooling fluid is advantageously superheated water.

The advantage of using such a "hot" cooling fluid is clear when it comes to implementing the first cooling (adjacent to the gas phase through which the device passes). When implementing the second cooling (on the side where the waste arrives), the use of such a "hot" cooling fluid can clearly be envisaged only if the waste is capable of withstanding the temperature of such a "hot" fluid. In general, the second cooling is implemented using a "cold" cooling fluid, such as water at ambient temperature.

Now that the principle of the main improvement provided by the invention to the method of direct vitrification has been stated (i.e. the principle of dual cooling implemented where the waste is introduced), the way in which it is carried out can be varied in contexts that are somewhat different.

In particular, the method of the invention can be implemented with a bath of glass that is practically pre-constituted (i.e. present in the reactor before the waste is introduced) or with a bath of glass that is built up as the reaction progresses starting from an initial minimum fill. In this second variant, which is preferred, the reactor starts up with an initial bath of glass of small volume (a starter bath) and it is subsequently fed both with waste and with substances for constituting a bath of glass. Said waste and said substances are indeed advantageously introduced as a mixture, and the waste can be thought of as one of the precursors of substances constituting said bath of glass. The reactor is thus fed continuously with waste and with substances for constituting the bath of glass, and indeed with additives therefor. Once a certain level has been reached, both types of feed are stopped and the bath of glass built up in this way is emptied out.

The waste, which in characteristic manner is cooled on being introduced, is incinerated at the surface of the bath of molten glass, in the presence of oxygen, said oxygen is delivered into the gas phase so as to act as an oxidizer therein.

Advantageously, in order to optimize the incineration in question, the amount of oxygen introduced is greater than the theoretically required stoichiometric quantity. Advantageously, the quantity introduced lies in the range 1.25 to 1.5 times said stoichiometric quantity. In any event, said quantity is controlled and does not interfere with the negative pressure that is maintained inside the reactor in conventional manner for obvious safety reasons. Said negative pressure is maintained by sucking out the combustion gases, with said suction being implemented under conditions which minimize the amount of waste, and above all the amount of ash, that is entrained.

The distribution of said oxygen within the gas phase overlying the bath of molten glass is advantageously optimized. In particular, steps are taken to ensure proper mixing of waste and oxygen when said waste is introduced. Thus, said waste is advantageously introduced immersed in a flow of oxygen. To obtain such a result, it is advantageous to use at least one oxygen feed circuit in the structure of the device for feeding said waste. In general, such a circuit operates in addition to means for feeding oxygen into the gas phase of the reactor, which means are independent of the device for feeding waste.

In addition to said oxygen that is delivered as oxidizer into the gas phase, it is advantageous when implementing the method of the invention to introduce oxygen into the bath of molten glass. Said method advantageously includes injecting oxygen into said bath of molten glass in sufficient quantity to minimize or even to avoid the formation of metal within said bath of glass; advantageously, oxygen is introduced in sufficient quantity to minimize or even to avoid the formation of metal within said bath of glass and also to impart moderate stirring to said bath of glass.

Said oxygen injected into the bath of glass serves to adjust the oxidation-reduction (redox) potential of said bath of glass, and makes it possible to limit the reducing nature of the glass.

By controlling the redox potential of the bath of glass in this way, it is possible within said bath of glass to avoid reducing oxides and thus to avoid forming metals. The presence of such metals within said bath is very harmful for the uniformity of said bath and thus for the quality of the vitrification obtained. In addition, this presence can give rise to real difficulties when implementing heating by induction . . . .

The oxygen injected into the bath of glass to minimize or even to avoid the formation of metal is advantageously introduced in sufficient quantity also to impart a certain amount of stirring to said bath of glass. The person skilled in the art knows how to optimize the quantity of oxygen necessary for these purposes. In any event, the quantity of oxygen must be sufficient to obtain the desired effect concerning the value of the redox potential, and indeed the desired effect concerning the value of said potential and the desired stirring, but under no circumstances must it be excessive insofar as the bath of glass although stirred and mixed must remain a bath of glass and must not be transformed into a foam . . . .

The term "oxygen" is used herein both for the oxidizer injected into the gas phase and advantageously for the oxidant injected into the bath of glass, since as a general rule said oxygen is indeed injected as a "pure" gas. Nevertheless, it is not impossible in the context of the invention to use a gas that contains oxygen, and in particular to use air, optionally enriched in oxygen, both as the oxidizer as the oxidant.

The oxygen injected into the bath of glass as an oxidant is advantageously introduced into the reactor beneath the surface of said bath of glass. Thus, the means for injecting said oxygen do not need to pass through the gas phase in said reactor, and are therefore subjected to one type of corrosion only, i.e. corrosion inherent to the bath of glass.

This type of remark applies to any device that needs to penetrate into said bath of glass in order to deliver any substance thereto (injecting oxygen is discussed above) or for measuring any parameter (such as temperature, redox potential, . . . ). Thus, any device for penetrating into said bath of glass is advantageously introduced into the reactor beneath the surface of said bath of glass so as to avoid any contact with the gas phase.

The method of the invention implemented with dual cooling of the device for feeding the reactor with the waste to be incinerated and vitrified is generally advantageously also implemented with cooling of the walls of the reactor and/or of any means introduced into said reactor whether in the gas phase or in the bath of glass. The cooling specific to said device for feeding waste is described above, and here reference is being made to all of the other means that might be introduced into the reactor and in particular those for feeding it with oxygen both in its gas phase (where said oxygen acts as an oxidizer) and advantageously within the bath of glass (where said oxygen acts as an oxidant for adjusting the redox potential of said bath of glass and advantageously also as stirring means).

This list of means that are advantageously cooled is not limiting. By way of illustration, it is possible to add thereto means for measuring the temperature of the gas phase, means for measuring the temperature of the bath of glass, means for monitoring the redox potential of said bath of glass, means for measuring the level of said bath of glass, . . .

Such cooling is intended above all to protect the walls of said means from corrosion. It is also appropriate to preserve the sealing devices that are installed where there are passages through said walls.

To implement such cooling in the walls of the reactor and of the various means introduced into said reactor, it is conventional to make use of cooling fluids, generally cooling liquids. Circuits for circulating such fluids are added to said walls and to said means. In a particularly preferred implementation of said cooling, provision is made to circulate at least one cooling fluid at least in the walls that come into contact with the gas phase and/or at least in the means introduced into the reactor that come into contact with said gas phase, where said fluid is maintained at a temperature that is higher than the dew point of said gas phase. The advantage of using a "hot" cooling fluid such as superheated water is described above with reference to the dual cooling of the device for feeding waste. It serves to avoid condensation on the surfaces of said walls and/or said means . . . .

In the method of the invention, in order to heat and maintain the bath of molten glass at a suitable temperature, use can be made of various techniques. Thus, said bath of glass can be heated by induction, by means of a flame, by using a plasma torch, or by means of electrodes dipped into the bath. It is not impossible to use a plurality of said techniques in combination. Induction heating is preferred; induction heating implemented in a cold crucible is most particularly preferred.

The method of the invention as described above and below with reference to the accompanying figures is particularly suitable for processing radioactive waste by direct vitrification.

Said method of the invention is generally implemented with waste being fed in continuously; said waste being introduced above the surface of the bath of glass, possibly mixed with substances suitable for constituting said bath of glass. After a fill has been incinerated and after the ash generated thereby has been digested in the bath of glass, said bath of filled glass is emptied out. Thus, the usual situation is continuous feed (or continuous building up of filler), with emptying out being performed discontinuously.

Nevertheless, in implementing the invention, the following can apply.

The reactor can be fed with waste and oxygen in a manner that is advantageously optimized so as to ensure maximum combustion of said waste while ensuring that the combustion gases entrain a minimum amount of said waste, whether burnt or unburnt. Such optimization relies on combined mastery of numerous parameters, some of which are mentioned above, and in particular mastery of the following:

- the size of said waste;
- the quantity of oxygen delivered;
- the level at which waste is introduced relative to the surface of the bath of glass (advantageously, provision is made to regulate the waste introduction level by regulating the introduction depth of the device for feeding said waste into the reactor); and
- the quality of the waste/oxygen mixture, when introducing said waste. It has already been mentioned that said waste is advantageously introduced immersed in oxygen. At least one oxygen feed circuit is advantageously included for this purpose in the structure of the device for feeding said waste.

There follows a description in general terms of the second aspect of the present invention, namely apparatus for processing organic waste in the form of divided solids and/or liquids by incineration and by vitrification; which apparatus is suitable for implementing the above-described method. In conventional manner, said apparatus comprises a reactor, associated firstly with heater means suitable for maintaining a bath of molten glass in the bottom of said reactor, and secondly fitted with the following means:

- means for emptying said bath of molten glass;
- a device for feeding it with waste to be incinerated and vitrified, said device opening out above the surface of said bath of molten glass and its depth of introduction into said reactor advantageously being adjustable;
- oxygen feed means delivering said oxygen above the surface of said bath of molten glass (to implement incineration); and
- at least one combustion gas outlet formed in the top portion of said reactor well above the surface of said bath of molten glass (in order to minimize entraining ash).

In characteristic manner, said apparatus includes a special device for feeding the waste to be incinerated and vitrified. This device has a tubular structure defined by an outer surface and an inner surface; in its thickness, said structure includes at least two advantageously independent circuits for circulating cooling fluids:

- at least one for cooling the thickness and the outer surface of the device (in order to minimize corrosion problems); and
- at least one other for cooling the inside surface of the device (in order to transfer a minimum amount of heat to the incoming waste).

Said structure can include a plurality of independent circuits for performing each of said two types of cooling.

It can also advantageously include means for conveying and delivering oxygen at its open end (above the bath of glass). Said oxygen can be delivered in particular by means of a torus arranged around the open end of said device, said torus being pierced by suitable orifices that are appropriately distributed. Contact between the waste and oxygen (oxidizer) can thus be optimized.

The inlets and outlets for the cooling fluids circulated in the structure of the device for feeding the reactor with waste, and the inlet advantageously provided for allowing oxygen to flow through said structure, are all connected to appropriate delivery and removal units. The distribution of said fluids and said oxygen in their respective circulation circuits within said feeder device is advantageously achieved by means of a set of suitably arranged distribution channels and chambers.

The essential elements of the apparatus of the invention necessary for implementing the intended incineration and vitrification method are the elements that are mentioned above. Other elements can be added thereto, such as means for measuring the temperature of the gas phase, means for measuring the temperature of the bath of molten glass, means for measuring the level of said bath of glass, means for measuring the redox potential of said bath of molten glass, . . . .

Said elements, whether essential or otherwise, advantageously include means for injecting oxygen into said bath of molten glass.

Said means are advantageously introduced into the bottom portion of the reactor, beneath the surface of the bath of glass so that they do not make contact with the gas phase and are therefore subject to one type of corrosion only (corrosion due to the bath of glass).

Said means are also advantageously arranged in such a manner that when they cease feeding oxygen, there is no danger of a glass plug being formed at their open ends. Thus, said means for injecting oxygen into said bath of glass are advantageously disposed vertically through the bottom (soleplate) of the reactor, and have openings that are disposed at 90° to the vertical.

As stated above, in general, it is advantageous to cool all of the means introduced into said reactor, whether they are introduced into the gas phase or into the bath of glass, and not only to cool the device for feeding said reactor with waste. Thus, in an advantageous embodiment of the apparatus of the invention, all of said means that are introduced into the reactor, and in particular the means for feeding the gas phase with oxygen, the means for injecting oxygen into the bath of glass, if present, include at least one circuit for circulating a cooling fluid within their structure.

Advantageously, the reactor is also cooled. Its walls are advantageously of the double-walled type, so as to allow a cooling fluid to circulate therein.

The heater means associated with said reactor can be of various types, and in particular can be suitable for implementing induction heating, flame heating, plasma torch heating, or heating by means of immersed electrodes. In a particularly preferred variant embodiment, the reactor used is a cold crucible and said heater means are induction heater means.

The invention is described below in its method and apparatus aspects with reference to the accompanying figures:

In FIG. 2, there can be seen the means for implementing the dual cooling of the invention where waste is introduced.

In FIGS. 1 to 4, the same references are used to designate the same elements, whether shown in diagrammatic or detailed manner.

Figure 1:
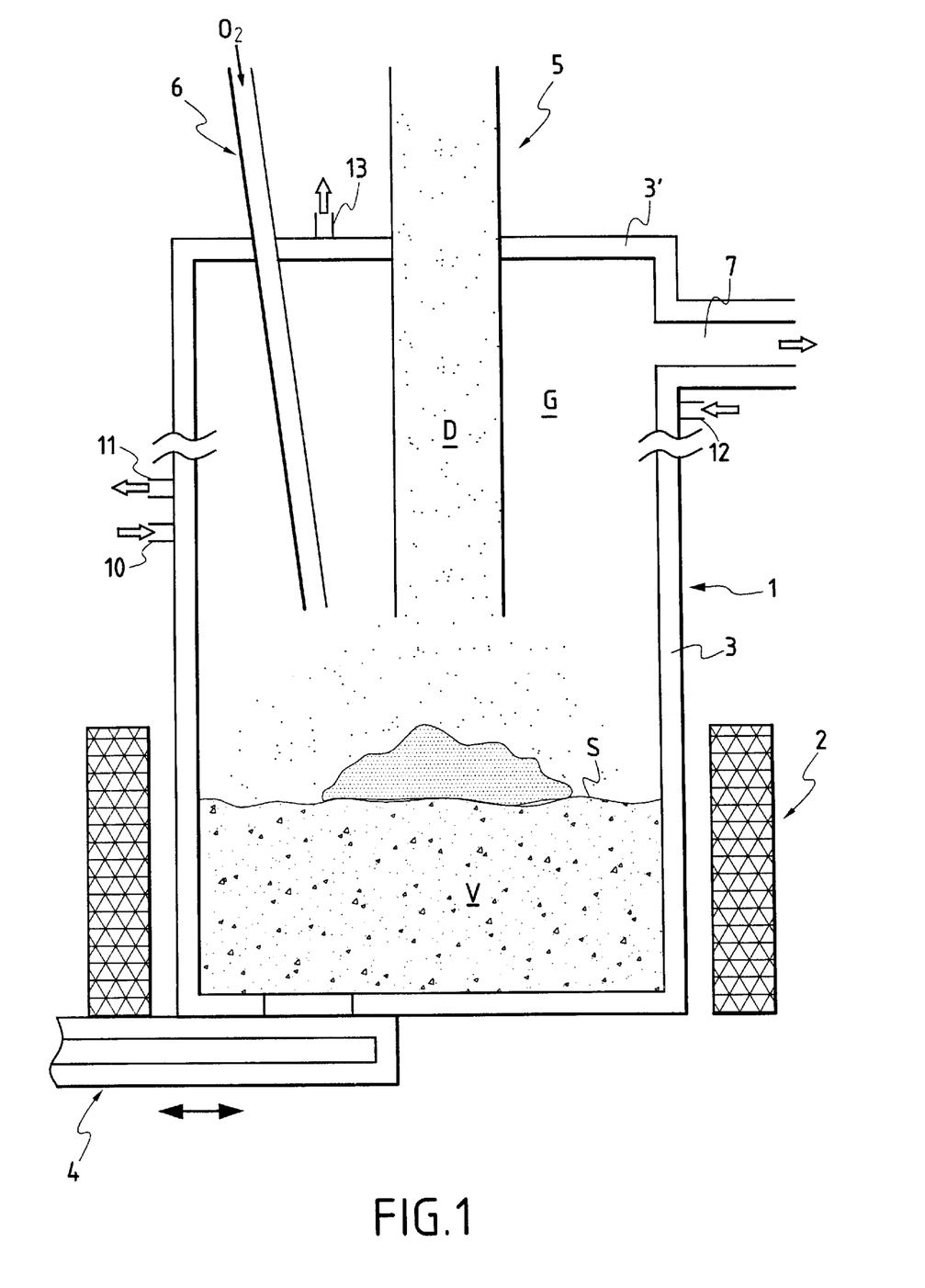
FIG. 1 is a diagrammatic view showing how apparatus of the invention operates.
Figure 2:
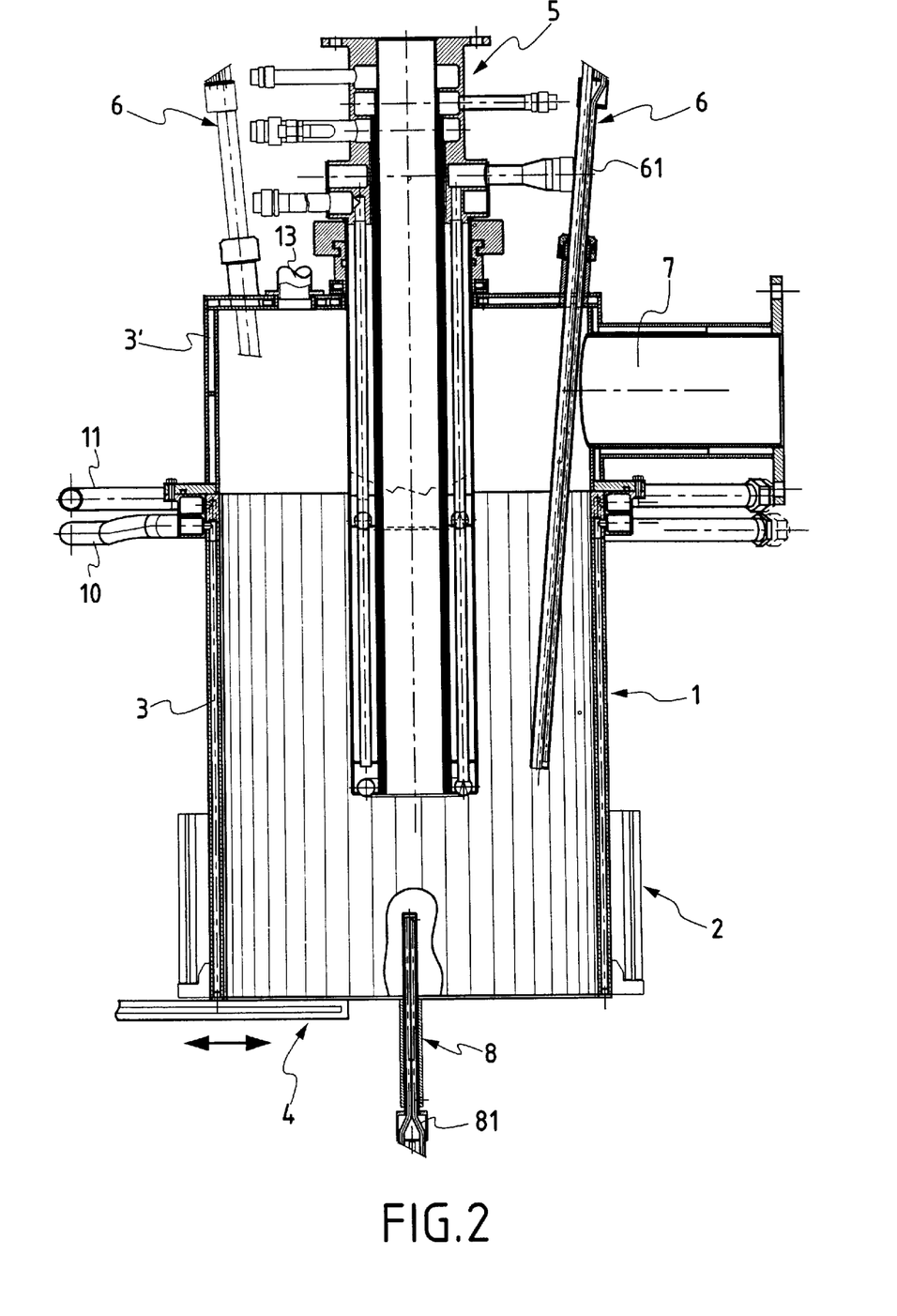
FIG. 2 is a more detailed section view of apparatus of the same type.

The apparatus of the invention is suitable for processing waste D by incineration and vitrification, i.e. by direct vitrification, and it comprises a reactor 1 associated with heater means 2. Said heater means 2 shown in FIGS. 1 and 2 are suitable for performing induction heating. Within said reactor 1, there can be found a bath of molten glass V surmounted by the gas phase G (FIG. 1).

The method of the invention is summarized with reference to FIG. 1.

The waste D is fed into the reactor 1 via a waste feeder device 5. The waste is decomposed on the surface S of the bath of molten glass V. The gas that results from this decomposition burns on coming into contact with oxygen which is delivered mainly by means 6. FIG. 1 shows a single means 6 for delivering oxygen into the gas phase. Advantageously there are at least two such means disposed symmetrically about said feeder device 5 for feeding said waste D. This is intended to optimize contact between waste D and oxygen in order to optimize combustion of said waste D.

The ash that is generated falls into the bath of glass V. At the surface S of said bath V, there is generally to be found a mass of waste that is in the process of decomposing.

In the upper portion of said reactor 1, there is provided an outlet 7 for the combustion gases. Beneath the bottom of said reactor 1, there are means 4 for emptying out the bath of glass V. Said means 4 are capable, in alternation, of closing and of opening an emptying orifice provided in the bottom of said reactor 1.

In characteristic manner, the device 5 for feeding waste D is fitted with means suitable for providing dual cooling of its structure. Said means are not visible in diagrammatic FIG. 1, however they can be seen in FIGS. 2 and 3.

Finally, FIG. 1 shows that the walls 3 and 3' of said reactor 1 are of the double-walled type. Since the reactor 1 is designed as two portions, its wall in its bottom portion is referenced 3, while its wall in its top portion is referenced 3'. Within each of these two walls 3 and 3', circulation of a cooling fluid is organized. For the wall 3, said fluid arrives via 10 and leaves via 11, while for the wall 3', it arrives via 12 and leaves via 13.

FIG. 2 shows each of the elements referenced in FIG. 1 in greater detail (with the exception of the cooling fluid inlet 12 for circulating cooling fluid in the top wall 3' of the reactor 1).

For a more detailed description of the device 5 for feeding the reactor with waste D, reference should be made to the description below concerning FIG. 3.

For a more detailed description of the means 8 for injecting oxygen into the bath of glass, reference should be made to the description below concerning FIG. 4.

In FIG. 2, it can be seen that the bottom of the reactor 1 has means 8 passing therethrough for injecting oxygen into the bath of glass V. Said injection means 8 are disposed vertically and present an opening 82 (see FIG. 4) at 90° to the vertical. FIG. 2 shows an advantageous embodiment of apparatus of the invention.

Said FIG. 2 shows two means 6 designed to feed the gas phase with oxygen (oxidizer). These means are constituted by blowpipes. Within the structure of each of said blowpipes 6, there is provided a circuit 61 for circulating a cooling fluid. The blowpipes are cooled in this way withstand corrosion better. It is recalled at this point that they are advantageously cooled by circulating a "hot" cooling fluid (i.e. a fluid maintained at a temperature which is higher than the dew point of the gas phase through which said they pass), thereby preventing any condensation on the outside surfaces thereof.

Figure 3:
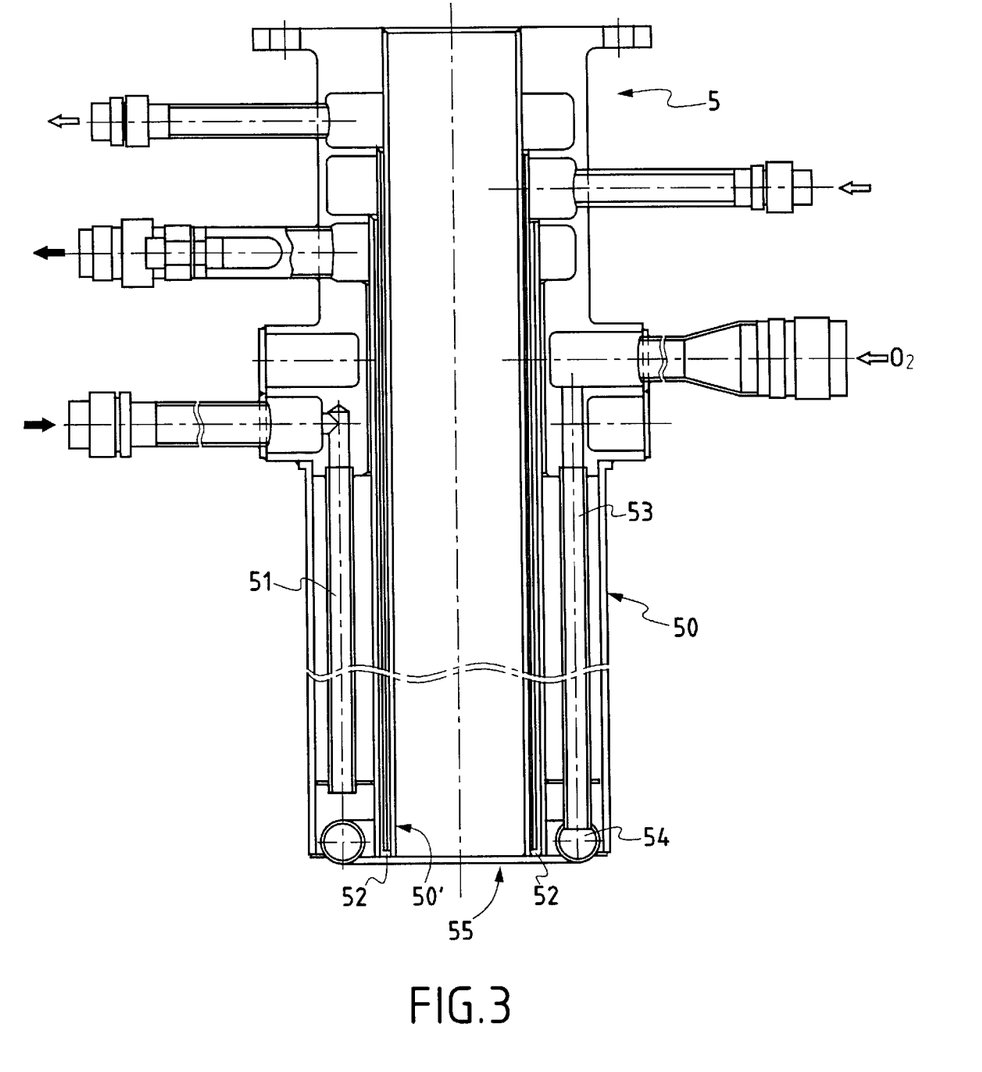
FIG. 3 is a detailed section view of the waste feeder device.

FIG. 3 thus shows a particularly advantageous embodiment of the device 5 for feeding the reactor 1 with waste D. Said device 5 has tubular structure defined by an outside surface 50 and an inside surface 50'.

In the thickness of said device there are to be found:
- at least one circuit 51 for circulating a cooling fluid for cooling said structure and mainly for cooling its outside face 50. The circulation of the cooling fluid is represented by black arrows;
- at least one circuit 52 for circulating a cooling fluid that is to cool said inside surface 50'. The circulation of said cooling fluid is represented by white arrows; and
- at least one circuit 53+54 for conveying and delivering oxygen to the end 55 of said device 5. Said oxygen is thus delivered all around said end 55 via a torus 54. Said torus 54 has orifices of appropriate dimensions suitably distributed to deliver said oxygen in optimized manner. This further optimizes contact between waste D and oxygen. Said oxygen as delivered via the waste feeder device 5 is delivered in addition to the oxygen delivered by the means 6 (see FIGS. 1 and 2).

It is recalled at this point that 51 advantageously conveys a "hot" cooling fluid. The cooling circuits 51 and 52 are totally independent of each other.

Figure 4:
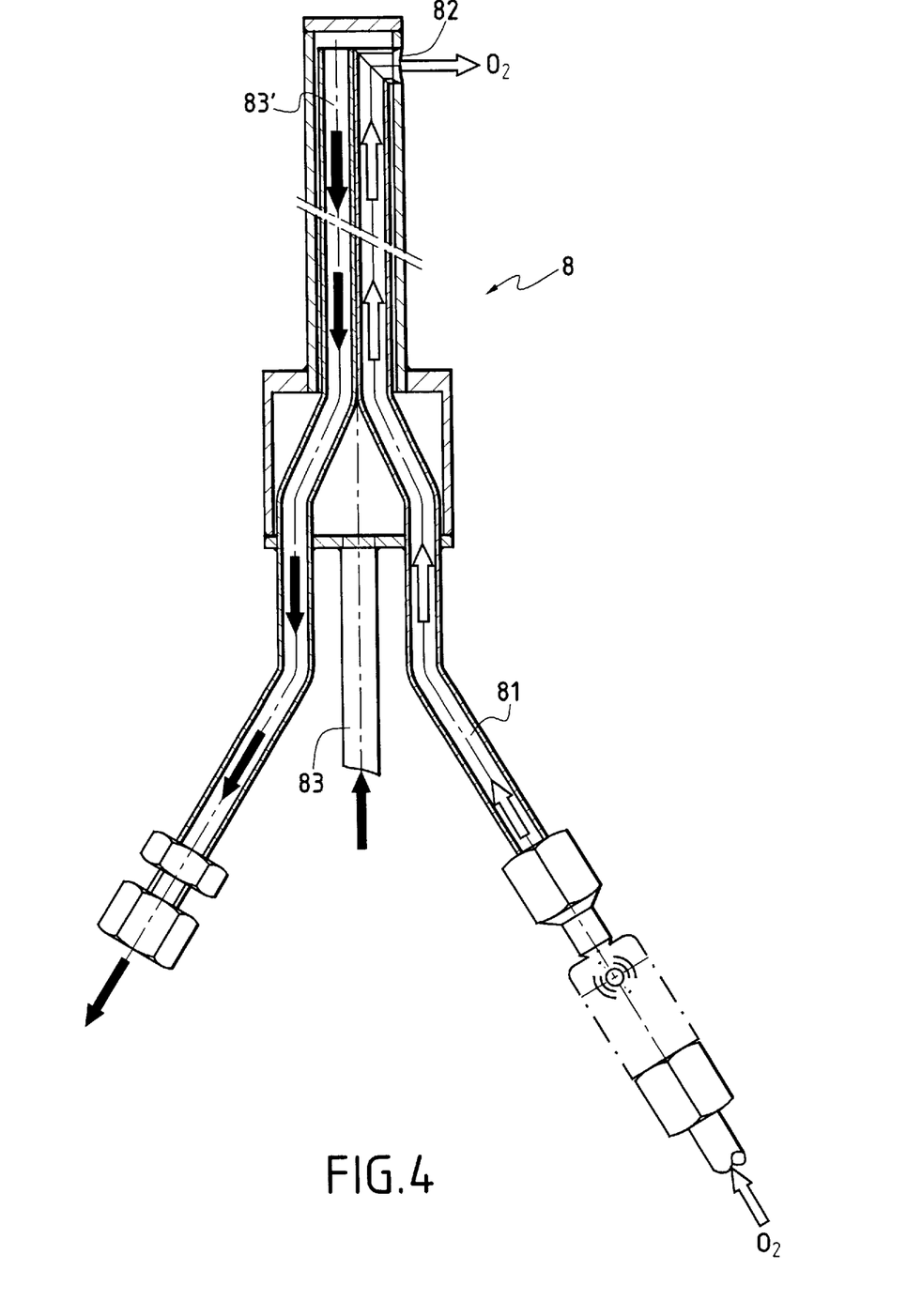
FIG. 4 is a detailed section view of the means for injecting oxygen into the bath of glass.

Finally, FIG. 4 shows means 8 for injecting oxygen into the bath of glass. Such means are used advantageously in association with a device for feeding waste as described above. Said means 8 comprise a circuit 81 for feeding said oxygen. The flow of said oxygen in said circuit 81 is represented by white arrows. The oxygen is delivered at 82 through an opening arranged at 90° to the axis of said means 8.

Said means 8 include a circuit 83+83' for circulating a cooling fluid within its structure. Its portion which penetrates into the bath of glass can thus be cooled. Said cooling fluid is admitted at 83 and leaves, carrying extra heat, via 83'. Its circulation is represented by black arrows.

What is claimed is:

1. A method of processing organic waste in divided solid and/or liquid form in a single reactor containing a bath of molten glass surmounted by a gas phase, comprising incinerating said waste in presence of oxygen at a surface of said bath, and vitrifying said incinerated waste in said bath, the method being characterized in that:

said waste is introduced into said reactor with associated dual cooling; a feeding device feeding said reactor with said waste is cooled on a first side thereof adjacent to the gas phase that it passes through, and said feeding device is also cooled on a second side thereof adjacent to said waste.

2. The method according to claim 1, characterized in that said waste is introduced immersed in a flow of oxygen.

3. The method according to claim 1, characterized in that in addition to oxygen delivered as an oxidizer into said gas phase, oxygen is also injected into said bath of molten glass in sufficient quantity to reduce metal forming within said bath of molten glass.

4. The method according to claim 3, characterized in that said oxygen injected into said bath of molten glass is introduced into said reactor beneath the surface of said bath.

5. The method according to claim 1, further comprising cooling walls of said reactor, and/or means, other than said feeding device, introduced into said reactor in said gas phase and in said bath of molten glass.

6. The method according to claim 5, characterized in that said walls of said reactor in contact with said gas phase and/or said means introduced into said reactor in said gas phase are cooled by circulating at least one cooling fluid that is maintained at a temperature higher than a dew point temperature of said gas phase.

7. The method according to claim 1, characterized in that said bath is heated by induction, by flame, by a plasma torch, or by means of electrodes dipped into the bath.

8. The method according to claim 1, characterized in that said method is implemented in a cold crucible heated by induction.

9. The method according to claim 1, characterized in that said waste is radioactive waste.

10. An apparatus for processing organic waste in divided solid and/or liquid form by incineration and vitrification, the apparatus comprising a reactor associated with heater means suitable for maintaining a bath of molten glass in a bottom portion of said reactor and fitted with:

means for emptying said bath of molten glass;

a feeding device for feeding said waste to be incinerated and vitrified, said feeding device having an open end opening above a surface of said bath of molten glass;

means for feeding oxygen, delivering said oxygen above the surface of said bath of molten glass; and at least one outlet for combustion gases provided in a top portion of said reactor well above the surface of said bath of molten glass;

the apparatus being characterized in that said feeding device is tubular in structure, and is defined by an outer surface and an inner surface defining a thickness therebetween and at least two independent circuits for circulating cooling fluids, at least one of said circuits cooling said thickness and said outer surface, and at least one other of said circuits cooling said inner surface of said feeding device.

11. The apparatus according to claim 10, characterized in that said feeding device also includes means for conveying and delivering oxygen at the open end of the feeding device.

12. The apparatus according to claim 10, characterized in that said reactor is also fitted with means for injecting oxygen into said bath of molten glass.

13. The apparatus according to claim 12, characterized in that said means for injecting oxygen into said bath of molten glass are introduced into the bottom portion of said reactor beneath the surface of said bath of molten glass.

14. The apparatus according to claim 12, characterized in that said means for injecting oxygen into said bath of molten glass are disposed vertically, pass through the bottom portion of said reactor, and present an opening at 90° to a vertical axis.

15. The apparatus according to claim 10, characterized in that means for feeding said reactor with oxygen, introduced into said reactor in a gas phase and in said bath of molten glass comprise at least one circuit for circulating a cooling fluid.

16. The apparatus according to claim 10, characterized in that said reactor has double-walled type walls, so as to enable a cooling fluid to circulate.

17. The apparatus according to claim 10, characterized in that said reactor is a cold crucible and said heater means are means for induction heating.

18. The method according to claim 1, comprising circulating through said first side at least one cooling fluid maintained at a temperature higher than a dew point temperature of the gas phase.

19. The method according to claim 1, wherein the coolings on said first side and said second side are carried out in independent manner.

20. The method according to claim 3, wherein said oxygen is injected into said bath of molten glass in sufficient quantity to reduce metal forming within said bath of molten glass and to impart moderate stirring to said bath of molten glass.

21. The method according to claim 5, comprising cooling a means feeding said reactor with oxygen.

22. The apparatus according to claim 11, wherein said means for conveying and delivering oxygen comprises a torus arranged around said open end.

* * * * *